UNITED STATES PATENT OFFICE.

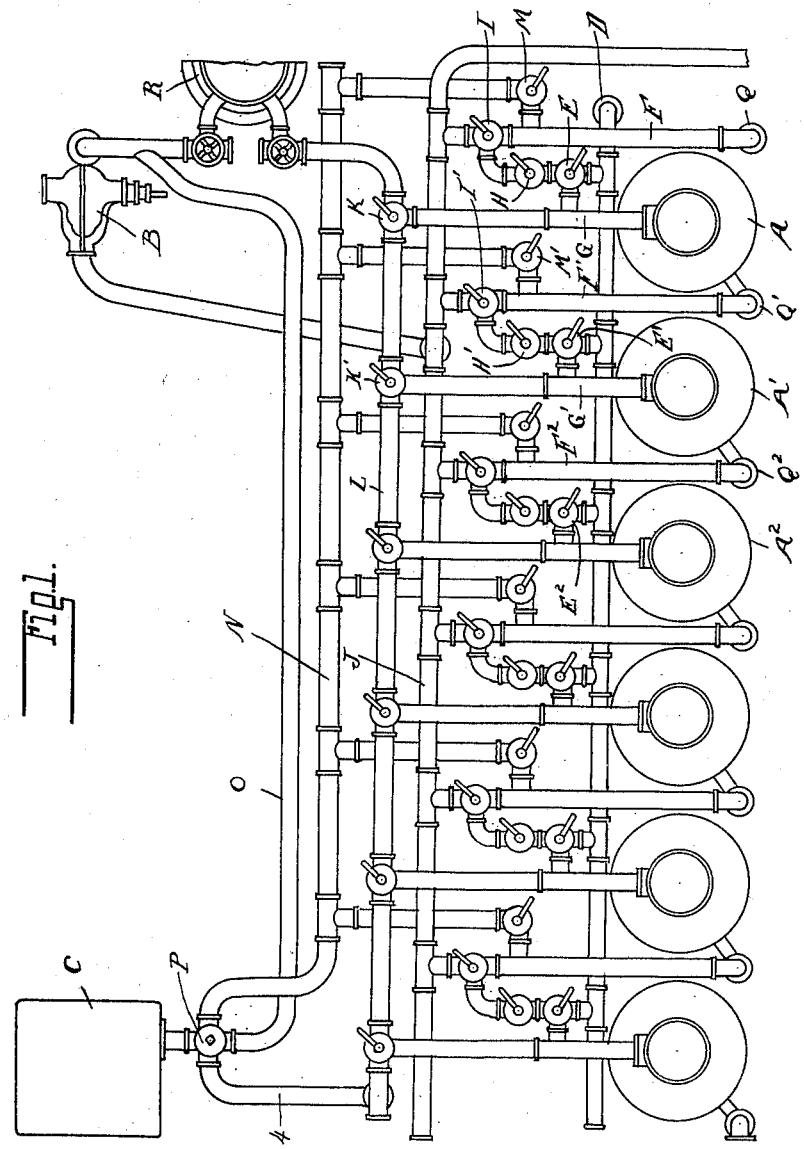

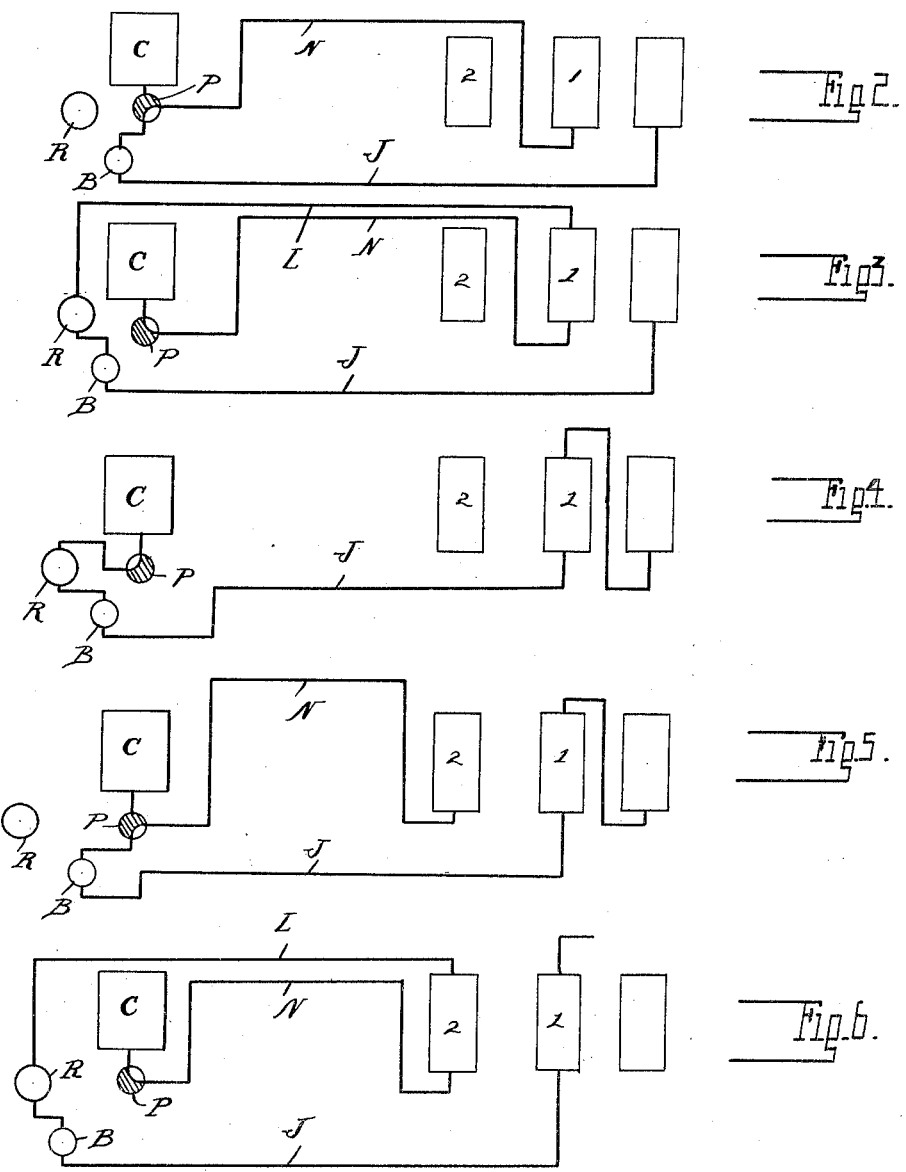

LEON NAUDET, OF CHELLES, FRANCE.

PROCESS OF EXTRACTING SUGAR.

1,343,737.  Specification of Letters Patent.  Patented June 15, 1920.

Original application filed March 5, 1914, Serial No. 822,666. Divided and this application filed May 24, 1916. Serial No. 99,477.

*To all whom it may concern:*

Be it known that I, LEON NAUDET, a citizen of the Republic of France, residing at Chelles, (S. & M.,) France, have invented certain new and useful Improvements in Processes of Extracting Sugar, of which the following is a specification, reference being had therein to the accompanying drawings.

The invention relates to sugar manufacture, and forms a division application Serial No. 822,666, filed March 5, 1914. It is the primary object of the invention to obtain an increased yield of the sugar juice, and further to obtain various other advantages as hereinafter set forth.

The central feature of the process is the method of initially raising the temperature of the sugar-producing material so as to produce complete sterilization, higher extraction and certain chemical changes, which increase the ultimate yield of sugar. With processes heretofore used, it has been practically impossible to secure this high initial temperature without encountering difficulties which are objectionable. Thus, in the usual method, the sugar-producing material is successively introduced into cells of a series in endless rotation, the fresh material being first saturated or "mashed" with the condensed juice, and in the rotation of the cycle being successively subjected to weaker and weaker juice, until finally it is treated with water. The exhaust material is then removed, the cell re-filled with fresh material and the cycle repeated. Two operations are performed with the introduction of each new cell in the series: First, the mashing, which drives out the air from the interstices of the sugar-producing material, the juice being introduced through the bottom of the cell; and second, the displacement of the mashing juice by an equal volume of juice admitted to the top of the cell. It is therefore possible to subject the freshly introduced sugar material to contact with twice the weight of juice before another cell is added to the series. This is not, however, sufficient to raise the temperature of the sugar material to that of the juice, as it is a physical fact that three weights of juice are required to bring the sugar-producing material to approximately the same temperature. Thus, assuming the temperature of the juice used in mashing and in displacing the mashing fluid is 100° C., the sugar-producing material in contact therewith will not have been raised to an equal temperature at the end of the second pass. It is impossible to treat the material to a third pass or third weight of hot juice without delaying the cycle,— for in the usual cycle a new cell is cut-in after two passes. Moreover, it is not generally desirable to mash with juice of maximum temperature, as this is apt to cause foaming.

With my improved method, I am enabled to subject the material in each newly-installed cell to three passes of equal-weight volumes of maximum temperature juice without delaying the cycle; furthermore, the mashing is effected by juice at a lower temperature, thereby avoiding foaming.

In the drawings:

Figure 1 represents a portion of an apparatus adapted for the carrying out of my improved process; and Figs. 2, 3, 4, 5 and 6 are diagrammatic views showing three cells of the series in successive stages of the operation.

The apparatus used comprises a series of cells, generally from 8 to 16 in number, which are so connected as to pass the juice therethrough in series, the individual cells being emptied and re-filled successively in endless rotation. The sugar is extracted by passing water into the nearly exhausted cell and through the same and the successive cells until juice of the maximum density is obtained. After each re-filling, the series is advanced one step; that is, the cell into which water was last introduced is emptied and re-filled, and the water connection is made to the next cell in the series. A pump is used for propelling the liquid, and a measuring tank serves to gage the quantity or volume of each pass, after which operation the passes are transferred to a container.

As shown, A A' A², etc., are the several cells of the series, B is the liquid-propelling pump and C is the measuring tank. D is a conduit forming a water connection, which may be coupled to the cells successively by controlling valves E E', etc. F F', etc., are pipes connected to the bottoms of the several cells, and G G', etc., are pipes connected to the tops of said cells. H H', etc., are valves controlling the connection between the pipes F and G of adjacent cells, and I I', etc., are valves controlling the connection to the pipes F with a line pipe J to which the pump B is coupled. K K', etc., are valves controlling connection between the pipes G G', etc., and a line pipe L also connected to the pump B. M M', etc., are valves controlling connection between the pipes F F', etc., and a line pipe N leading to the measuring tank C. O is a by-pass between the measuring tank and pump, and P is a four-way valve controlling connection between the line N, by-pass O and tank C. The construction and arrangement just described is not essential to the invention, and any other arrangement may be employed in place thereof, which is capable of effecting the sequence of operations as hereinafter described.

It is usual to place in the connections between adjacent cells heaters for raising the temperature of the juice passing from one cell to another. These heaters Q Q', etc., are used merely in starting the system, and when in normal operation all or substantially all of the heat is supplied by a single heater R. This is arranged in the connection between the conduit L and the pump, in such a manner that it may be coupled with any one of the cells of the series according to which of the valves K K', etc., is opened.

As has been above-stated, it is the central object of the process to raise the temperature of the sugar-producing material in the newly-installed cell to the maximum temperature, and to accomplish this by the passing therethrough of three equal-weight volumes of juice at the temperature desired; also to mash with juice at a lower temperature. This may be accomplished by a single heating of a single pass of juice in each cell, as shown in the diagrams Figs. 2 to 6 inclusive.

In Fig. 2, cell number 1 contains fresh sugar-producing material, which is mashed by juice entering the bottom of the cell, the juice being at less than maximum temperature, as will be hereinafter explained. In Fig. 3, the mashing juice in cell 1 is displaced by juice entering the top of the cell and which has been passed through the heater R and raised to maximum temperature, such as 100° C. or over, the mashing juice being displaced into the measuring tank C. In Fig. 5, the first-pass maximum-temperature juice in cell 1 is displaced by a second pass of juice from the preceding cell, which may be assumed to be at the same maximum temperature of 100° or over. The displaced first-pass juice enters cell 2, which has just been installed with fresh sugar-producing material and is used for mashing this material. In Fig. 6, a third-pass of juice from the preceding cell and at the same maximum temperature is passed through cell 1 to displace the second-pass juice therein, and this displaced second-pass juice is passed through the heater R and enters cell 2 to form first-pass juice for this cell and to displace the mashing juice therefrom into the measuring tank C. After this third-pass the material in cell 1 will have acquired the full temperature of 100° C., and consequently any further passes of juice through this cell will not be lowered in temperature by the material therein. Thus, a fourth pass of juice through the cell 1, which will displace third pass juice therefrom to form the second pass for cell 2, will enter said cell at the maximum temperature of 100° C., and a fifth pass through cell 1, displacing juice to form a third pass through cell 2, will also enter the latter cell at the maximum temperature of 100°. In this manner there are three passes of juice at maximum temperature through cell 2, and in like manner there will be three maximum-temperature passes through each succeeding cell of the series.

In the above, it has been assumed that the juice used in each pass is an equal-weight volume to the sugar-producing material in the cell. In practice, however, more than such a volume, such for instance as one and one-fourth weight volumes of juice, is desirable in carrying out the proper extraction of the sugar, which takes place after the material is raised to the required temperature and is subject to contact with juice of less density. It is not, however, necessary to pass more than three equal-weight volumes of the hot juice, which is at maximum temperature through the cells to raise the temperature of the material therein to the desired point, and the passage of more than this quantity of hot juice at the maximum temperature is detrimental, as it produces a cooking effect which softens the material and renders extraction difficult. To take care of this extra volume of juice, there is intermediate the steps illustrated in Figs. 3 and 5, the step shown in Fig. 4. In this step the surplus volume of juice passes through the cell 1 without first being reheated, then through the heater R directly into the measuring tank C, instead of passing through said heater before entering the cell 1.

The sequence of operations described in connection with Figs. 2 to 6 may be accomplished by proper adjustment of the valves E H K and L, and by manipulation of the four-way valve P. The construction of the apparatus, however, forms no part of the present application, and it is therefore unnecessary to describe the same in detail.

It will be observed that with my improved process, exactly measured volumes of juice pass through each cell, there being but one circuit from the point of introduction of the water to the point of ejection of the condensed juice. All movement in this system is by displacement, and the measuring tank is an exact gage of the volumes displaced these volumes after being measured being transferred to a suitable container (not shown). As a result, perfect uniformity in the density of the juice is obtained and exact thermal conditions are also maintained. Furthermore, it is possible with this system to accomplish that which has not been practically accomplished with any system heretofore employed,—viz., the raising of the temperature of the sugar-producing material to 100° C. or over after the third equal volume pass of juice and without the necessity of supplying further heat throughout the system. Still further, this is accomplished by supplying all of the heat necessary to raise the temperature of the sugar-producing material in a single pass. Thus my improved method in addition to its various advantages permits of the use of a simplified apparatus.

In the process as above described it has been assumed that the cells of the battery when once in full operation are successively emptied and refilled in advance of the juice and in endless rotation. The quantities of material used in recharging the cells will vary with different apparatus and also according to the particular quality and condition of the material, but to more clearly describe the operation I will give one specific application as follows:

Assuming the capacity of each cell to be 1000 pounds of the sugar-producing material and that 1200 pounds of juice is required for the extraction of the sugar from this material, the average of successive passes will be 1200 pounds. When each cell is mashed 1100 pounds of juice is drawn therein, which is sufficient for the proper mashing and is indicated in cell 1 Fig. 2 of the diagram. The alternate pass is 1300 pounds of juice, of which 600 pounds is passed as indicated in Fig. 3 by way of the heater R to displace the mashing juice in cell 1, being what I have termed first-pass juice. The remaining 700 pounds of the 1300 pounds of juice is passed, as shown in Fig. 4, by way of the heater R and then directly into the measuring tank. The next operation, in which mashing juice is drawn into cell 2, is again a 1100 pound pass and this quantity of juice will pass into cell 1, constituting what I have termed as second-pass juice. Following this 1300 pounds of juice (600 plus 700) will pass into cell 1 and will constitute what I have termed third-pass juice. Adding together the passes one, two and three, which have entered cell 1, they will equal 3000 pounds or three times the weight of the sugar-producing material in the cell. On the other hand, the quantity of juice that is advanced between each recharging of a cell is only 2400 pounds or the sum of 1100 and 1300, but by reason of the fact that the advancing of the cells is in the same direction as the advance of the juice it would be possible to pass 3700 pounds of hot juice through each newly installed cell. It is not desirable to pass such a quantity of hot juice over the beets before the beginning of extraction on account of the cooking and softening of the material, and therefore I have reduced the quantity to 3000 pounds, which is all that is required to bring the material up to the full temperature.

Without the use of the reheater R for bringing the first-pass juice up to full temperature after it has lost a part of its heat as third-pass juice in the preceding cell, it would be impossible to maintain the desired maximum temperature. Thus with displacement systems that have heretofore been used the temperature is necessarily limited to under 90° C., while with the recirculating systems, such as in applicant's prior Patent No. 746,734, it is impossible to obtain uniform results.

What I claim as my invention is:—

1. In a sugar-extracting process, feeding the juice by successive displacements through a series of cells constituting a single undivided circuit from the point of introduction to the point of passing permanently out from the system, mashing each recharged cell with juice which has passed through the entire extraction series, reheating juice from the cell preceding the mashed cell to a temperature of above 90° C., and displacing the mashing juice thereby.

2. In a sugar-extracting process, feeding the juice by successive displacements through a series of cells constituting a single undivided circuit from the point of introduction to the point of passing permanently out from the system, mashing each recharged cell with juice which has passed through the entire extraction series, reheating juice from the cell preceding the mashed cell to a temperature above 90° C., displacing the mashing juice thereby, displacing the latter juice by juice directly from the preceding cell, and mashing a new cell with the last displaced juice.

3. In a sugar-extracting process, the steps of displacing the mashing juice directly into the measuring tank by juice derived from the preceding cell and heated in transit therefrom to the maximum temperature desired, displacing the latter volume by a second pass derived from the same preceding cell and mashing with the displaced juice a new cell, and displacing the second-pass juice by a third pass derived from the same preceding cell and reheating said displaced second-pass juice to form the first-pass for the succeeding cell, the three passes together being substantially three times the weight of the sugar-producing material in the cell, whereby in a series of operations involving the above steps all three passes are maintained at a temperature above 90° C. and the sugar-producing material is raised to the same temperature.

4. In a sugar-extracting process, the method of raising the temperature of sugar-producing material to the desired point, comprising feeding the juice by successive displacements through a series of cells constituting a single undivided circuit from the point of introduction to the point of passing permanently out from the system, passing through each newly mashed cell of three volumes of juice together equal to three times the weight of sugar-producing material in the cell, maintaining the temperature of said passes by reheating displaced second-pass juice from one cell to form first-pass juice for the succeeding cell and utilizing displaced first-pass juice for mashing said succeeding cell.

5. In a sugar-extracting process, the method of raising the temperature of the sugar-producing material to a predetermined point comprising the passing by successive displacements of three volumes of juice at the desired temperature through each newly mashed cell, said volumes together being equal to three times the weight of the sugar-producing material in the cell, maintaining the temperature of said passes by reheating second-pass juice from one cell to form first-pass juice for the succeeding cell, utilizing first-pass juice for mashing the succeeding cell and displacing the mashing juice for each cell directly into the measuring tank.

6. In a sugar-extracting process, the method of raising the temperature of the sugar-producing material to above 90° C., comprising the passing by successive displacements through each newly mashed cell of three volumes of juice derived from a preceding cell and together equal to three times the weight of the sugar-producing material in the cell, the juice of all of said passes being at the predetermined temperature, reheating displaced second-pass juice to the desired temperature to form first-pass juice for a succeeding cell, utilizing displaced first-pass juice for mashing said succeeding cell and displacing the mashed juice from each cell directly into the measuring tank.

7. In a sugar-extracting process, the method of raising the temperature of the sugar-producing material to any desired point, comprising the passing by successive displacements through each newly mashed cell of three volumes of juice at the desired temperature and together equal in weight to three times that of the sugar-producing material in the cell, reheating displaced second-pass juice to the desired temperature to form first-pass juice for a succeeding cell, passing the surplus volume of reheated juice directly into the measuring tank, utilizing displaced first-pass juice for mashing the succeeding cell and displacing the mashing juice from each cell into the measuring tank.

In testimony whereof I affix my signature.

LEON NAUDET.